United States Patent [19]
Hakoun et al.

[11] Patent Number: 5,188,268
[45] Date of Patent: Feb. 23, 1993

[54] DEVICE FOR CUTTING AN OPTICAL FIBER OBLIQUELY

[75] Inventors: Roland Hakoun, Domont; Michel Reslinger, Bondoufle; Joan Galopin, Saint Leger en Yvelines, all of France

[73] Assignee: Alcatel Fibres Optiques, Bezons Cedex, France

[21] Appl. No.: 693,481

[22] Filed: Apr. 30, 1991

[30] Foreign Application Priority Data

May 3, 1990 [FR] France ................... 90 05571

[51] Int. Cl.⁵ .................... B26F 3/00; C03B 37/16
[52] U.S. Cl. .................... 225/96.5; 225/105
[58] Field of Search ............... 225/2, 96, 96.5, 101, 225/103, 105, 102, 104

[56] References Cited

U.S. PATENT DOCUMENTS

| | | | |
|---|---|---|---|
| 3,138,308 | 6/1964 | Oakley | 225/102 X |
| 3,268,137 | 8/1966 | Martin | 225/102 X |
| 4,036,419 | 7/1977 | Hensel et al. | 225/96.5 |
| 4,154,385 | 5/1979 | Lewis | 225/96.5 |
| 4,159,793 | 7/1979 | Belmonte et al. | 225/101 X |
| 4,202,475 | 5/1980 | Hirai et al. | 225/96.5 X |
| 4,216,004 | 8/1980 | Brehm et al. | 225/96.5 X |
| 4,229,876 | 10/1980 | Doty | 225/101 X |
| 4,257,546 | 3/1981 | Benasutti | 225/96.5 |
| 4,445,632 | 5/1984 | Margolin et al. | 225/96.5 X |
| 5,048,908 | 9/1991 | Blonder et al. | 225/96.5 X |

FOREIGN PATENT DOCUMENTS 8904579 7/1989 Fed. Rep. of Germany .

OTHER PUBLICATIONS

Patent Abstracts of Japan, vol. 6, No. 88 (P-118) [1966], May 26, 1982; and JP-A-57 24 903 (Hitachi Densen K.K.) Feb. 9, 1982.

*Primary Examiner*—Eugenia Jones
*Attorney, Agent, or Firm*—Sughrue, Mion, Zinn, Macpeak & Seas

[57] ABSTRACT

A device for use in on-site conditions to obtain a section plane which reproducibly makes an angle of 5°, for example, relative to the axis of an optical fiber. The device includes a clamp for holding the fiber at a first point, a rotary clamp for holding the fiber at a second point and for twisting it about the axis of the fiber. The device further includes two jaws for holding the fiber at a third point after it has been twisted by means of the rotary clamp. A convex anvil subjects the fiber to tension after it has been twisted. A diamond cutter is employed for cleaving the fiber. The invention is applicable to providing an optical fiber cutting tool suitable for cutting the fiber obliquely on the worksite.

5 Claims, 5 Drawing Sheets

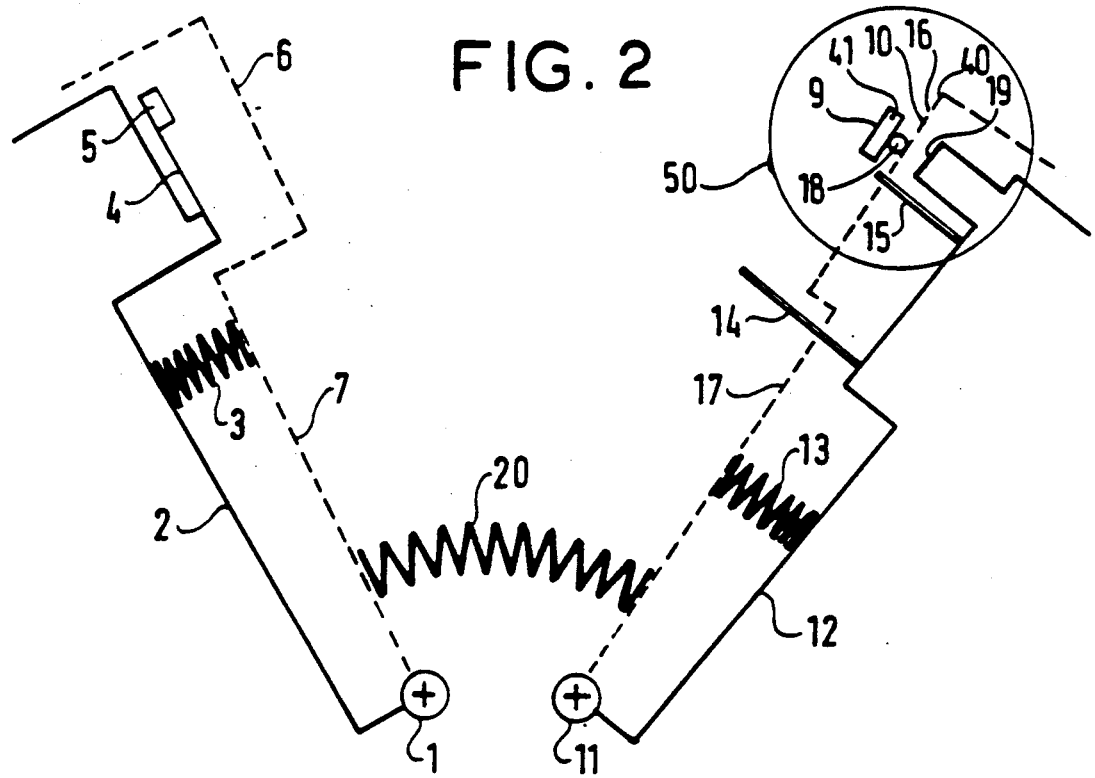
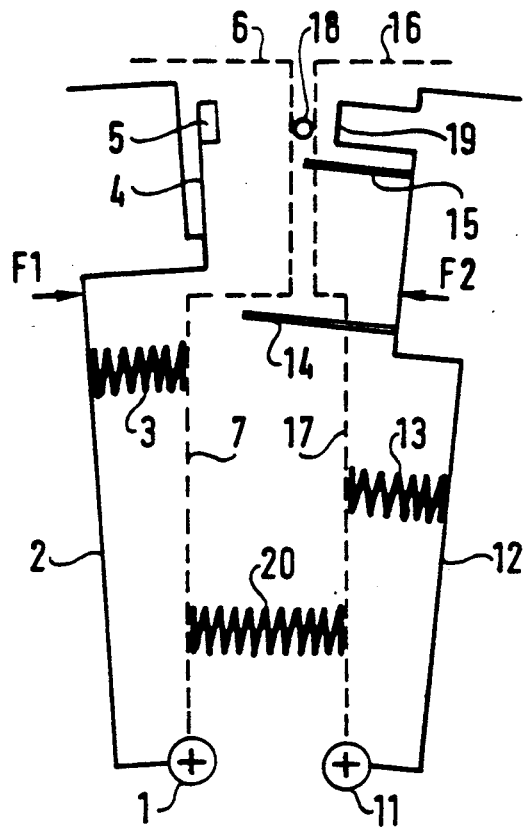

FIG. 4
FIG. 5
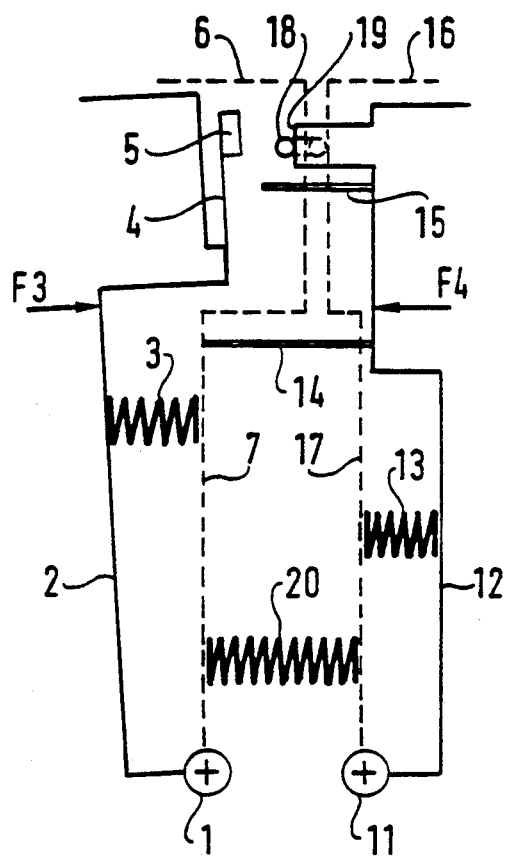
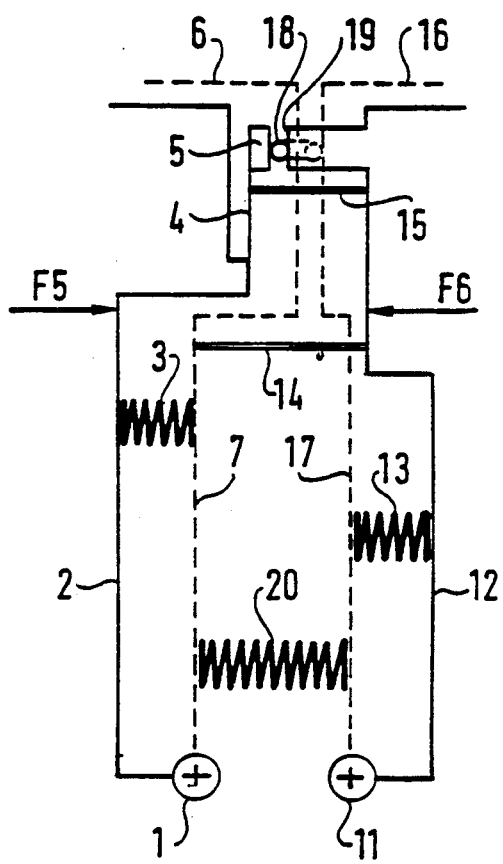

DEVICE FOR CUTTING AN OPTICAL FIBER OBLIQUELY

The invention relates to a device for cutting an optical fiber obliquely, i.e. in a section plane that is not perpendicular to the axis of the fiber.

BACKGROUND OF THE INVENTION

To obtain optimum operation of an optical link, it is necessary for optical fiber ends to be prepared. A conventional way of doing this consists in providing a plane surface perpendicular to the axis of the fiber by means of a cutting device. When two fibers are placed end to end, these two plane surfaces are brought into coincidence and they produce reflections that may degrade transmission characteristics. A known way of remedying this defect is to provide the end of each fiber with a plane surface that is not exactly perpendicular to the axis of the fiber, with the normal of the plane being at an angle of 5 degrees to the fiber axis, for example. A known way of making such a plane surface is to cut the fiber in a section plane perpendicular to its axis by means of a conventional cutting tool and then to polish the section plane in such a manner that the resulting surface is inclined, e.g. at 5 degrees to the axis of the fiber. This method is complicated to implement, particularly under on-site conditions.

Japanese patent application No. 57-24903 describes a method of cutting an optical fiber obliquely, which method consists in holding the optical fiber at two points by means of two clamps, in twisting the fiber, in tensioning the fiber by applying a convex anvil thereagainst, after which cleavage is initiated by means of a diamond cutter. A smooth cutting plane is obtained at an angle of inclination which is a function of the torsion and of the tension applied to the fiber. However, there is no device on the market suitable for implementing this method or a similar method to cut an optical fiber obliquely under on-site conditions and with reproducible accuracy of within 1°.

An object of the invention is to provide a device enabling an optical fiber to be cut obliquely in a section plane at an angle that is reproducibly predetermined to an accuracy of within 1° and over a temperature range of 0° C. to 40° C., which device should be simple to use, robust, and cheap.

SUMMARY OF THE INVENTION

The present invention provides a device for cutting an optical fiber obliquely, the device comprising:

a first, second, and third means constituting fixing means for fixing an optical fiber at three respective points that are in alignment; said fixing means being disposed in that order; the third fixing means being rotatable about the axis of the fiber relative to the first fixing means to twist the fiber after it has been fixed in the first and third fixing means and before it has been fixed in the second fixing means;

a convex anvil situated between the first and second fixing means;

a diamond cutter;

fourth means for applying the anvil against the fiber in order to tension it between the first fixing means and the second fixing means after it has been twisted by rotation of the third fixing means;

fifth means for applying the cutter against the fiber where it overlies the anvil; and sixth means for guiding the fiber while it is being installed in the first and third fixing means;

wherein the first, second, third, fourth, and fifth means all include at least one part mounted to rotate about an axis parallel to the direction of the fiber.

The fiber is initially held in the first and third means, and it is then twisted by rotating the third means about the axis of the fiber. Finally the fiber is locked in place by the second means which are situated between the first and third means. Between the first and second means, the fiber is twisted through an angle that is a fraction of the angle of rotation of the third means relative to the first means. Consequently, the fiber is cut while in a state of twist whose angle is determined with better accuracy than is the angle of rotation of the third means. This ensures that the angle of the section plane is more reproducible and has higher accuracy than can be achieved when using only the first means and the third means for fixing the fiber and for twisting it.

Because all of the mechanisms of the device are rotatable about an axis parallel to the direction of the fiber, they are very greatly simplified and the device can be opened wide for:

inserting the fiber into the device, thereby practically avoiding any risk of polluting the section plane;

cleaning the inside of the device to remove cutting residues due to previous operations, thereby contributing to reducing pollution risks; and maintenance purposes, in particular adjusting and replacing the diamond cutter.

The simplicity of these mechanisms means that they are not very sensitive to wear with respect to accuracy in positioning the fiber.

In a particular embodiment:

the fifth means for applying the diamond cutter and the fourth means for applying the anvil respectively include a first part and a second part mounted to rotate in opposite directions; said parts being suitable for moving towards each other under finger pressure exerted by an operator and for moving away from each other under the action of at least one return spring when operator finger pressure is no longer being exerted;

the second means for fixing the fiber comprise: two jaws; a third part for applying a first one of the jaws from one side of the fiber relative to its axis; and a fourth part for applying a second one of the jaws from the opposite side of the fiber; the third and fourth parts rotating in opposite directions to each other and being driven respectively by the first and second parts via springs such that: the two jaws are applied against the fiber first; the anvil is applied second; and the cutter is applied third; and the first and third fixing means for fixing the fiber are integral with the third part.

This makes the device particularly simple to use. In a first stage, the operator fixes the fiber in the first and third means, and the third means are then rotated through a given angle to twist the fiber. Thereafter all of the other operations required for cutting purposes are performed by applying finger pressure to the third and fourth parts: the fiber is held in position by the second means; the convex anvil is applied against the fiber; and then the cutting edge of the diamond is applied against the fiber where it overlies the anvil. These operations are performed automatically and in that order merely by applying pressure on the third and fourth parts of the device.

The means for guiding the fiber may comprise: a plane part formed with a V-groove and situated outside the first, second, and third fixing means, adjacent to the first fixing means, and accessible to an operator to enable the operator to press the fiber into the groove with a finger.

This makes it possible to increase the accuracy with which the fiber is positioned when it is installed in the device for the purpose of being cut. Such positioning accuracy makes it possible to use a diamond having a shorter cutting edge, which diamond is therefore cheaper, and above all it makes it possible to obtain better reproducibility in the angle of the section plane compared with the angle that can be obtained without such means for guiding the fiber.

BRIEF DESCRIPTION OF THE DRAWINGS

An embodiment of the invention is described by way of example with reference to the accompanying drawings, in which:

FIGS. 2, 3, 4, and 5 show four successive stages in using an embodiment of the invention.

DETAILED DESCRIPTION

Figure 1:
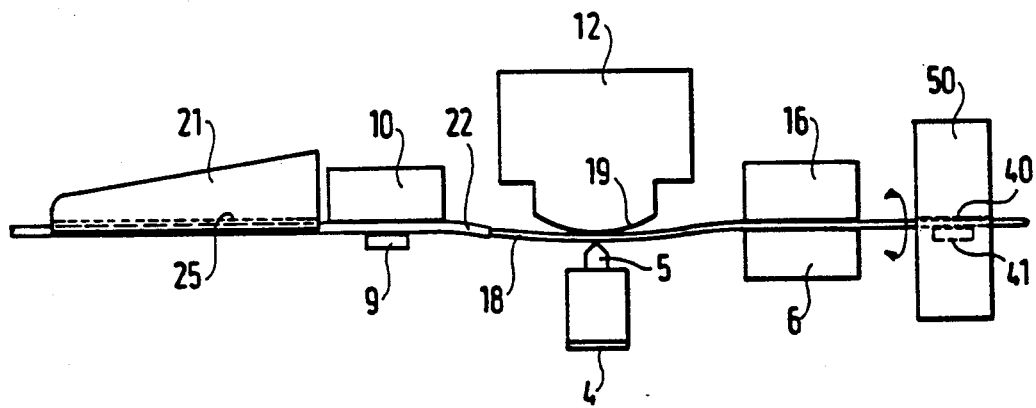
FIG. 1 is a diagram showing an embodiment of the invention during the last stage of operation that terminates with the fiber being cleaved.

FIG. 1 is highly diagrammatic and shows the final stage in operating an embodiment of the device of the invention to cut an optical fiber 18 which has been stripped of its covering 22 over a length close to its end. The cut is made in the stripped end portion. The fiber 18 where it is still inside its covering 22 is received in a V-groove guide 25 formed in a plane metal part 21. It is fixed at a first point by being clamped by a clamp constituted essentially by a base 10 and a presser pad 9 bearing against the covering 22 of the fiber 18. The stripped fiber 18 is fixed at a second point by being clamped between two jaws 16 and 6. The fiber is also fixed at a third point by being clamped in a rotary clamp constituted by a base 40 and a presser pad 41. The clamp 40, 41 is rotatable about an axis coinciding with the axis of the fiber when the presser pad 41 clamps the fiber against the base 40. A knob 50 serves to rotate the clamp 40, 41. The shape of the base 40 is described in greater detail below.

The fiber 18 is locked in position initially by means of the clamp 9, 10, and then by means of the clamp 40, 41. It is then twisted by rotating the clamp 40, 41. Thereafter it is locked in place by clamping the jaws 6, 16. A convex anvil 19 is then pressed against the stripped fiber 18 to put it under tension. Finally a diamond cutter 5 is applied against the fiber 18 where it overlies the anvil 19 and in a direction normal to the surface of the anvil and to the axis of the fiber 18. At the instant shown in the figure, the cutting edge has penetrated slightly into the fiber 18, thereby initiating cleavage which propagates both because of the torsion and because of the tension in the fiber 18. The combination of torsion and tension causes cleavage to take place in a plane which is inclined at an angle that is a function of the tension and of the torsion exerted on the fiber 18.

The anvil 19 is constituted by a curved surface on a part 12. The diamond cutter 5 is applied against the fiber by means of a spring blade 4.

With one example of fiber, and for a distance of 50 mm between the clamp 9, 10 and the rotary clamp 40, 41 a cut sloping at an angle of 5°±1° is obtained by rotating the clamp 40, 41 through 1/6-th of a turn. The cutter 5 is applied at a distance of about 16 mm from the clamp 9, 10 so that the effective twist angle between the clamp 9, 10 and the point where the cutter 5 is applied in this example is 1/18-th of a turn. It should be observed that to obtain good reproducibility, it is important to apply torsion before applying traction.

FIGS. 2 to 5 show all of the operating stages applicable to this embodiment. The parts constituting this embodiment are shown highly diagrammatically in order to show up the operation of each part clearly. The axis of the fiber 18 is perpendicular to the plane of these figures. The overall shape of the device is that of a clamp that opens widely to allow a fiber 18 that is to be cut to be installed therein. In FIG. 2, the clamp is wide open to enable the fiber 18 to be installed. The clamp has two axes of rotation 1 and 11 which are parallel to each other and parallel to the direction of the fiber. The essential parts of the clamp are the following:

a part 2 rotatable about the axis 1 and supporting the diamond cutter 5 on the spring blade 4;

a part 7 rotatable about the axis 1 and supporting the jaw 6;

a part 17 rotatable about the axis 11, and supporting the jaw 16, the base 10 of the clamp 9, 10 and the base 40 of the clamp 40, 41, with the base 40 being rotatable relative to the part 17;

a part 12 rotatable about the axis 11, and supporting the anvil 19 and two abutments 14 and 15;

a spring 3 interposed between the parts 2 and 7 to move them apart when the clamp is at rest;

a spring 13 interposed between the parts 12 and 17 to move them apart when the clamp is at rest; and a spring 20 interposed between the parts 7 and 17 to move them apart when the clamp is at rest.

In FIG. 2, the surface of the jaws 16, the base 10 of the clamp 10, 11, and the base 40 of the rotary clamp 40, 41 all appear to coincide since they lie in the same plane. Similarly, the presser pad 9 of the clamp 9, 10 and the presser pad 41 of the clamp 40, 41 appear to coincide. The clamp is shown at rest, but the fiber 18 has been installed and the presser pads 9 and 41 have been clamped to lock the fiber in position in the clamp 9, 10 and in the rotary clamp 40, 41.

In FIGS. 3, 4, and 5 the presser pads 9 and 41, the knob 50, and the base 40 of the rotary clamp 40, 41 are all omitted in order to clarify these figures. Nevertheless, it should be understood that the fiber 18 continues to be held in these two clamps.

The parts 2 and 12 are the outermost parts of the clamp. When an operator makes use of the clamp, the parts 2 and 12 are urged towards each other by applying finger pressure. The parts 7 and 17 are the innermost parts of the clamp and they are driven by the parts 2 and 12 by means of the springs 3 and 13. When the clamp is at rest, it is held wide open by the spring 20 which moves the parts 7 and 17 apart. The operator can then place the fiber in the groove 25 of the plate 21 as shown in FIG. 1, and then in the clamp 9, 10, and in the clamp 40, 41. Thereafter the clamp 9, 10 is closed, and the rotary clamp 40, 41, is closed. The rotary clamp is then rotated through a predetermined angle which is a function of the desired angle for the section plane.

FIG. 3 shows the second stage in operating the clamp. The operator's fingers apply opposing forces F1 and F2 to the parts 2 and 12. These forces are transmitted by the springs 3 and 13, causing the parts 7 and 17 supporting the jaws 6 and 16 to move towards each other. The spring 20 is fully compressed while the springs 3 and 13 are compressed only a little, thereby ensuring that the cutting edge of the diamond 5 and the anvil 19 are not yet applied against the fiber 18. The fiber 18 is held in an accurately rectilinear position.

Throughout the entire period the clamp is in operation (which takes very little time), the user keeps the base 40 in the position that determines the desired torsion angle.

FIG. 4 shows the third operating stage of the clamp. The operator's fingers apply slightly greater force than before on the parts 2 and 12, i.e. opposing forces F3 and F4 which are greater in magnitude than the forces F1 and F2. The springs 3 and 13 are now compressed, but the spring 13 is compressed much more than the spring 3, even though they are identical springs, because the distance of the spring 13 from the axis 11 is shorter than the distance of the spring 3 from the axis 1. The spring 20 is not compressed any further since the jaws 6 and 16 were pressed against the fiber 18 during the first operating stage. Compression of the spring 13 causes the convex anvil 19 to be pressed against the fiber 18, thereby putting it under tension. The tension exerted on the fiber 18 by the anvil 19 is limited by abutment means 14 which determine the minimum distance between the part 12 supporting the anvil 19 and the part 7 supporting the jaw 6 on the side of the fiber 18 opposite to the anvil 19.

FIG. 5 shows the fourth operating stage of the clamp. The operator's fingers exert even greater pressure on the parts 2 and 12 giving rise to two opposite forces F5 and F6 that are greater in magnitude than the forces F3 and F4. The spring 3 is more compressed than before. The part 2 applies the cutting edge of the diamond 5 against the fiber 18. It nicks the fiber to a depth of a few microns, thereby initiating cleavage. Cleavage is performed by the nick propagating under the effect of the tension and the torsion in the fiber. The force with which the cutting edge 5 is applied is not determined by the forces F5 and F6, but by the bending force provided by the spring blade 14 that connects the cutter 5 to the part 2. The depth to which the cutter 5 penetrates into the fiber 18 is limited by the abutment 15 which determines the minimum distance between the cutter 5 and the anvil 19.

The successive operating stages described above take place in succession and in the order described while the operator merely exerts continuous finger pressure. The fiber and the lopped-off end are released, firstly by releasing finger pressure so that the jaws 6 and 16 are opened by the spring 20, and then by unclamping the clamps 9, 10 and 40, 41.

Figure 6:
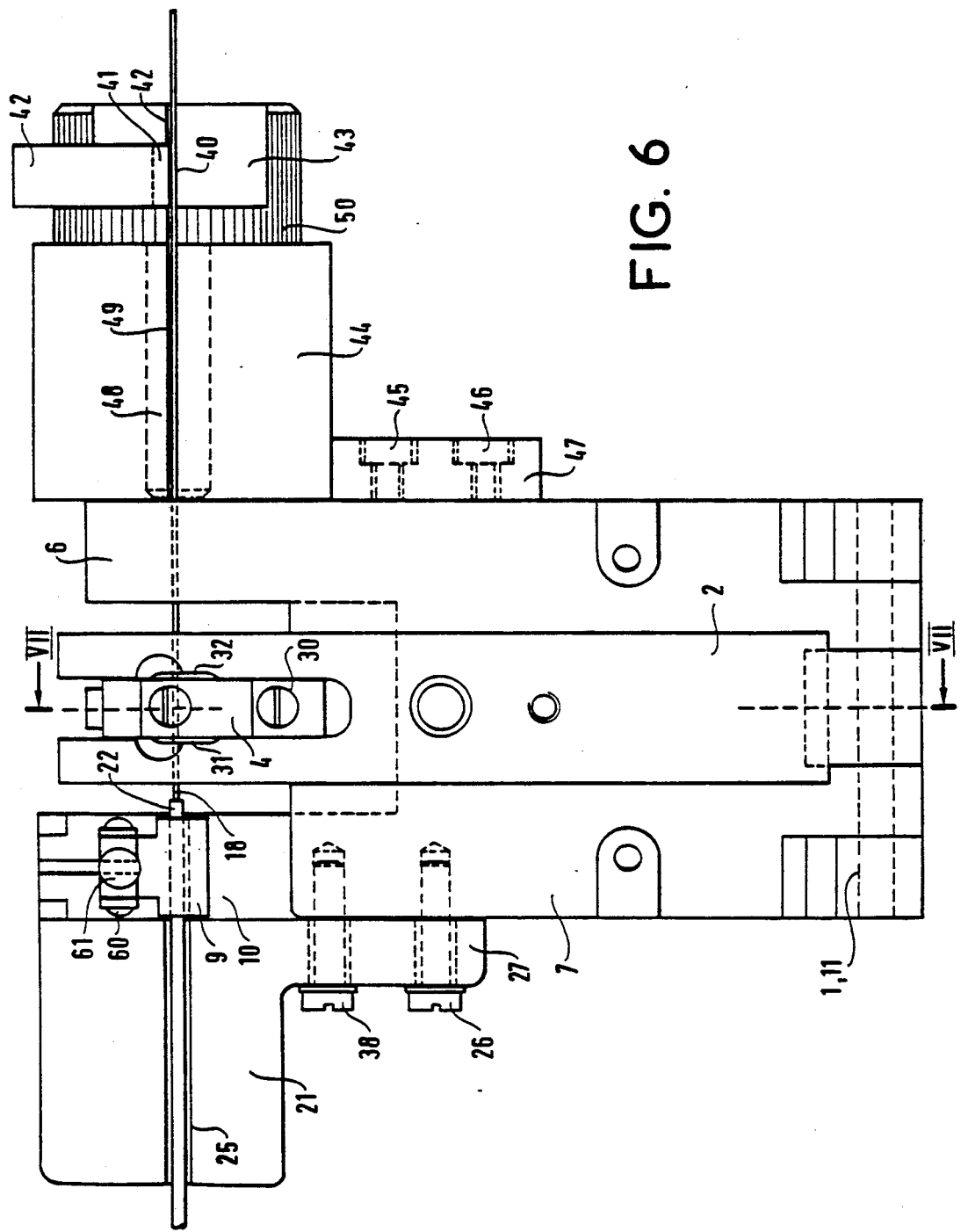
FIGS. 6 and 7 show an embodiment of the invention in greater detail, respectively in elevation and in section on a plane perpendicular to the fiber axis.

FIG. 6 is an elevation view of an embodiment of the invention. In particular, it shows the optional guide means for improving the positioning accuracy of the fiber 18 level with the anvil 19 and the cutter 5. These means comprise a plate 21 provided with a V-groove 25 for positioning the covered fiber 18, 22 outside the clamp. The plate 21 is parallel to the plane of the jaws 6, 16 and lies outside the clamp. It includes a fixing lug 27 attached to the part 6 by two screws 26 and 38. The plate 21 is accessible so the operator can hold the fiber in the groove 25 with a finger of the left hand while another finger of the left hand bears against the opposite face of the plate 21. These guide means contribute to obtaining a cut orthogonal to the axis of the fiber reproducibly to within an accuracy of 1°.

The base 10 of the clamp 9, 10 has a plane surface parallel to the planes of the jaws 6, 16 and to the plane of the part 21. The presser pad 9 is clamped against the fiber by a toggle mechanism 60 that is manually actuated by a lever 61.

The rotary clamp includes a knurled knob 50 which is generally cylindrical in shape, having its axis of symmetry coinciding with the axis of the fiber 18. It is extended by a smooth cylindrical rod 48 that constitutes a rotary shaft for the rotary clamp. The knob 50 and the rod 48 include a radial slot 49 for enabling the fiber 18 to be installed in such a manner that its axis coincides with the axis of symmetry of the knob 50 and the rod 48. The knob 50 includes a cavity containing a lever 42 bearing against the presser pad 41. A flat 43 formed in the knob 50 facilitates manipulating the lever 42. The base 40 of the clamp is constituted by the bottom of the cavity containing the lever 42. This bottom coincides with one of the walls of the slot 49 to constitute the base 40 on which the fiber 18 is pressed by the presser pad 41.

The rod 48 rotates in a support 44 including a fixing lug 46 attached to the part 17 by two screws 45 and 46, with the part 17 being hidden in this figure by the part 7. The support 44 is close to the part 7 but it does not bear thereagainst, leaving room for the jaws 6 to move. A graduation co-operates with the knob 50 to enable the angle of twist to be read off.

In this embodiment, the jaw 6 is integrated in the part 7 which is made of aluminum, for example. The general shape of the part 7 is that of a two-prong fork. The jaw 6 is constituted by one of the prongs of the fork. The cutter 5 is mounted on a support 31 which passes between the two prongs of the fork. The spring blade 4 connects the support 31 to the part 2 which is an arm that is displaceable in the midplane of the fork. The support 31 is fixed to the spring blade 4 by a screw 32. The blade 4 is fixed to the part 2 by a screw 30.

The jaw 16 is integrated in the part 17 which is made of aluminum, for example. The general shape of the part 17 is that of a two-prong fork, one of the prongs constituting the jaw 16 and the other constituting the base 10 for the clamp 9, 10. The part 12 is similar in shape to the part 2. The anvil 19 is an integral portion of the part 12 and it passes between the two prongs of the part 17. The part 12 is likewise made of aluminum.

Figure 7:
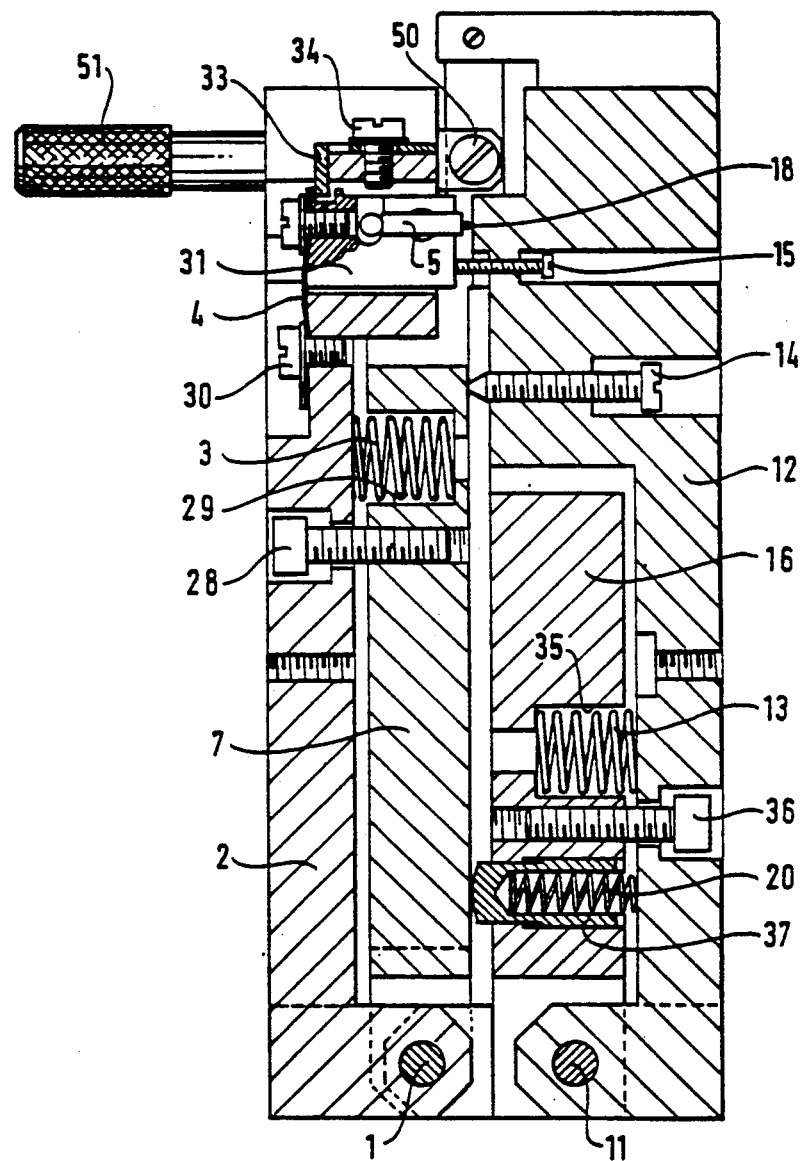

FIG. 7 is a section view through the same embodiment as seen in the direction of arrows VII. In FIG. 7, it can be seen that the displacement of the part 31 supporting the cutter 5 is limited by a part 33 which is fixed to the part 2 by a screw 34. The abutment 15 is constituted by a screw which is screwed through the part 12 and whose end comes into abutment against the part 31. The abutment 14 is constituted by a screw likewise screwed through the part 12 and coming into abutment against the part 7. The spring 3 is received in hole 29 formed in the part 7 in a face that faces the part 2. The spring 13 is received in a hole 35 formed in the part 16 in a face facing the part 12.

The spring 20 is received inside a cylindrical pusher 37 which is received in a hole formed through the part 16 and opening out to face the part 7 and the part 12. A shoulder in this hole and a shoulder on the pusher 37 limit the stroke of the pusher 37 so that it cannot escape from the hole even when the clamp is wide open. The clamp may be opened to an angle of about 90° and this angle is limited solely by the shapes of the parts 2, 7, 17, and 12 in the vicinity of their axes of rotation 1 and 11. The parts 2 and 7 are moved apart by the spring 3 to an extent which is limited by an abutment screw 28 sliding in a hole through the part 2 and screwed into the part 7. The extent to which the parts 16 and 12 are moved apart by the action of the spring 13 is limited by a screw 36 sliding in a hole through the part 12 and screwed into the part 16.

FIG. 7 shows the lever 51 and a portion of the toggle mechanism 50 in the position where they are clamped onto the fiber 18.

The scope of the invention is not limited to the embodiments described above. Numerous variants will occur to the person skilled in the art. In particular, it is possible to fix the clamp on a support for use in a workshop by fixing the part 12 to a support. The user then merely needs to press against the part 2 in order to make a cut.

We claim:

1. A device for cutting an optical fiber obliquely, the device comprising:

first, second, and third means constituting fixing means for fixing an optical fiber at three respective points that are in alignment; the third fixing means including means for rotating the axis of the fiber relative to the first fixing means to twist the fiber while maintaining the fiber on said axis after it has been fixed in the first and third fixing means and before it has been fixed in the second fixing means;

a convex anvil situated between the first and second fixing means;

a diamond cutter;

fourth means for applying the anvil against the fiber in order to tension it between the first fixing means and the second fixing means after it has been twisted by rotation of the third fixing means;

fifth means for applying the cutter against the fiber where it overlies the anvil; and sixth means for guiding the fiber while it is being installed in the first and third fixing means; and wherein the first, second, third, fourth, and fifth means each include at least one part mounted to rotate about an axis parallel to the axis of the fiber.

2. A device according to claim 1, wherein:

the fifth means for applying the diamond cutter and the fourth means for applying the anvil respectively include a first part and a second part mounted to rotate in opposite directions; said parts being suitable for moving towards each other under finger pressure exerted by an operator and for moving away from each other under the action of at least one return spring when operator finger pressure is no longer being exerted;

the second means for fixing the fiber comprise: two jaws; a third part for applying a first one of the jaws from one side of the fiber relative to its axis; and a fourth part for applying a second one of the jaws from the opposite side of the fiber; the third and fourth parts rotating in opposite directions to each other and being driven respectively by the first and second parts via springs such that: the two jaws are applied against the fiber first; the anvil is applied second; and the cutter is applied third; and the first and third fixing means for fixing the fiber are integral with the third part.

3. A device according to claim 1, wherein the means for guiding the fiber comprise: a plane part formed with a V-groove and situated outside the first, second, and third fixing means adjacent to the first fixing means and accessible to an operator to enable the operator to press the fiber into the groove with a finger.

4. A device according to claim 1, wherein the first fixing means comprise a toggle action clamp.

5. A device according to claim 1, wherein the third fixing means comprise a rotary clamp including a presser pad and a base rotatable about an axis coinciding with the axis of the fiber.

* * * * *